United States Patent [19]
Wolfson et al.

[11] Patent Number: 5,719,975
[45] Date of Patent: Feb. 17, 1998

[54] OPTICALLY RECONFIGURABLE CONDUCTIVE LINE ELEMENT

[75] Inventors: Ronald I. Wolfson, Los Angeles, Calif.; Ruth A. Mullen, Bellevue, Wash.; William W. Milroy, Playa del Rey, Calif.

[73] Assignee: Hughes Electronics, Los Angeles, Calif.

[21] Appl. No.: 711,729

[22] Filed: Sep. 3, 1996

[51] Int. Cl.$^6$ .............................. G02B 6/26; G02B 6/42
[52] U.S. Cl. ......................................................... 385/48
[58] Field of Search ........................... 385/39, 48, 22, 385/23, 43, 120, 116, 121, 147, 142, 143; 359/142, 180, 117, 118; 250/227.2

[56] References Cited

U.S. PATENT DOCUMENTS

| | | | |
|---|---|---|---|
| 4,033,687 | 7/1977 | Hirayama et al. | 385/116 |
| 4,141,641 | 2/1979 | Nagai et al. | 385/120 |
| 4,558,255 | 12/1985 | Genovese et al. | 250/227.2 |
| 4,850,047 | 7/1989 | Iguchi et al. | 359/117 |
| 4,939,482 | 7/1990 | Nergaard et al. | 359/180 |
| 5,071,212 | 12/1991 | Mesaki et al. | 385/11 |
| 5,446,811 | 8/1995 | Field et al. | 385/23 |

*Primary Examiner*—Akm E. Ullah
*Attorney, Agent, or Firm*—Leonard A. Alkov; Wanda K. Denson-Low

[57] ABSTRACT

An optical fiber having a conductive layer disposed therearound has sections removed therefrom that form gaps that expose the underlying optical fiber. Light manifolds are formed at each gap, such as are provided by Bragg gratings photoinduced in the core at each gap, and photoconductive material is disposed at each of the gaps. An opaque coating may optionally be disposed over the outside of the photoconductive material to ensure that it is activated by light propagating within the optical fiber. Light transmitted down the fiber may be controllably coupled output of the fiber at each of the gaps. The optical fiber thus provides multiple functions including electrical conductor, light manifold, and substrate on which the photoconductive material is deposited.

19 Claims, 1 Drawing Sheet

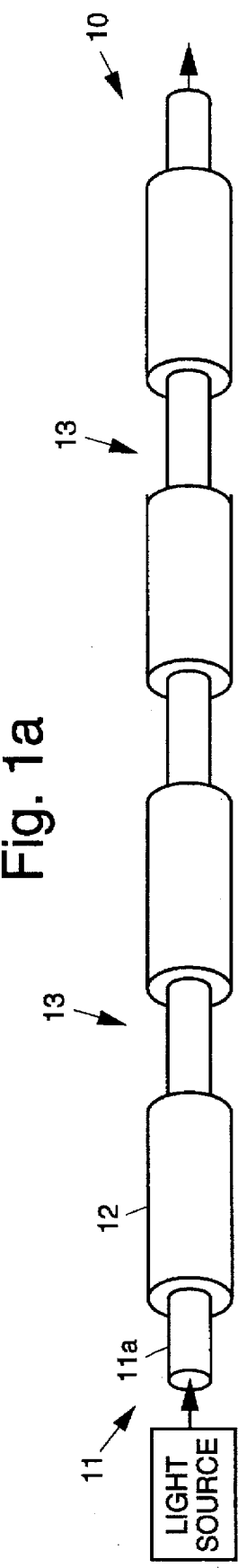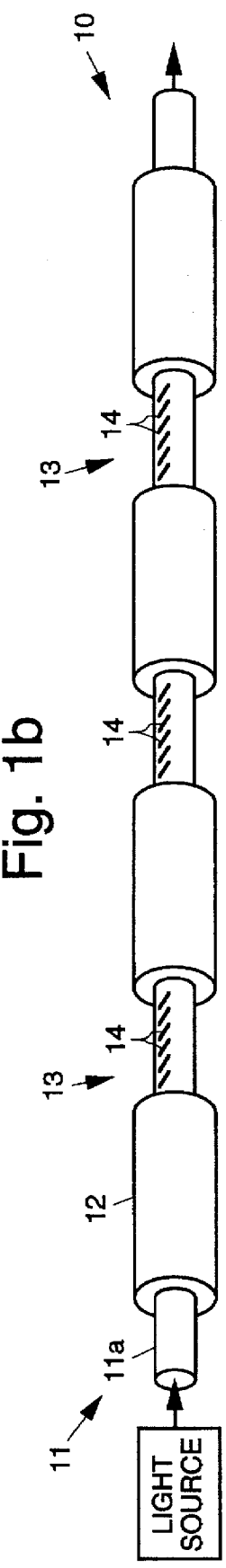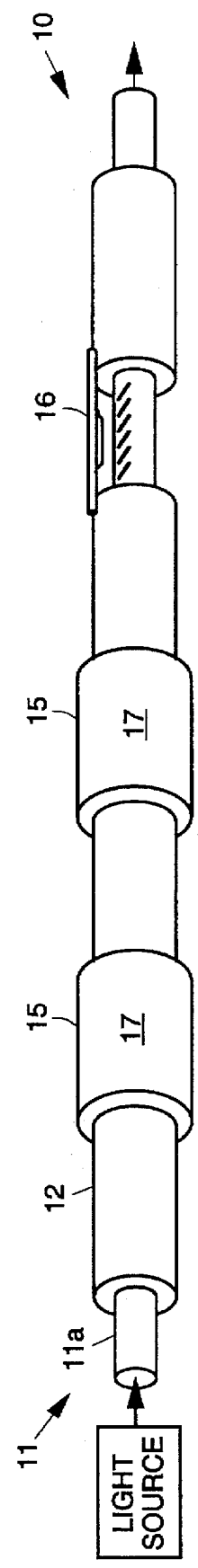

OPTICALLY RECONFIGURABLE CONDUCTIVE LINE ELEMENT

BACKGROUND

The present invention relates generally to conductive line elements, and more particularly, to an optically reconfigurable conductive line element for use in reconfigurable antennas and microwave devices, and the like.

Prior art relating to the present invention is disclosed in a paper entitled "The Synaptic Antenna for Reconfigurable Array Applications-Description,", by Dempsey et al., published in Symp. Digest, IEEE Antennas and Propagation Society International Symposium (San Jose, Calif.), June 1989, pp. 760–763. This paper discloses a synaptic antenna, which consists of conducting segments of line that can be connected by optically driven switching junctions to reconfigure three-dimensional antenna architectures. Each switching junction consists of six orthogonal line segments, six photoconductive cells that behave as a single-pole single-throw (SPST) switches and six optical fibers to control the individual cells. This degree of complexity is necessary for the general case of a three-dimensional reconfigurable array. However, there exist many antenna configurations with simpler geometries, such as a continuous transverse stub (CTS) array antenna developed by the assignee of the present invention and disclosed in U.S. Pat. No. 5,266,961, for example, that can be reconfigured with synaptic matrices in just one or two dimensions.

The synaptic antenna is also described in U.S. Pat. No. 4,728,805, entitled "Synaptic Radio Frequency Interactive Systems with Photoresponsive Switching," issued to Dempsey. The synaptic antenna is a three-dimensional matrix of electrically conductive line segments separated by photoconductive switches. When photons are incident on a given switch, the two adjacent line segments become connected to each other. By selecting the manner in which the line segments of the matrix are to be interconnected, various RF architectures can be optically reconfigured. While such a three-dimensional matrix provides maximum reconfigurability, it is overly complex for many antenna and other microwave geometries that require just one- or two-dimensional changes. An array only $10\lambda \times 10\lambda \times \lambda$, for example, with line segments $\lambda/10$ long would contain nearly 100,000 synapses, each having six line segments, six photoconductive switches and six optical fibers.

Accordingly, it is an objective of the present invention to provide for an improved optically reconfigurable conductive line element for use in reconfigurable antennas and microwave devices, and the like.

SUMMARY OF THE INVENTION

To meet the above and other objectives, the present invention provides for a simple means to implement optically reconfigurable conductive line elements. The present invention employs a one-dimensional geometry wherein conductive line segments, optical manifold and photoconductive switches are integrated into a single optical fiber. More specifically, the present invention uses a single metallized optical fiber that serves the combined functions of conductive line segments, optical manifold and substrate for implementing the photoconductive switches.

More specifically, the present optically reconfigurable conductive line element employs an optical fiber having a core and a conductive layer disposed therearound. The conductive layer has sections that are removed therefrom that form gaps therein which expose the underlying optical fiber. Light manifolds are formed at each gap, such as are provided by Bragg gratings that are photoinduced in the core of the optical fiber at each gap. Photoconductive material or devices are disposed at each of the gaps in the conductive layer. An opaque coating may optionally be disposed over the outside of the photoconductive material to ensure that it is activated only by light propagated within the optical fiber, and not by external sources of light. The optical fiber provides multiple functions including that of an electrical conductor, a light manifold, and a substrate on which the photoconductive material is deposited.

The present invention may be used as basic elements for constructing a multitude of useful antenna and other microwave architectures with reconfigurable attributes such as frequency, bandwidth, beam configuration, polarization, and device size and shape. Examples, of applications for the present invention include reconfigurable surfaces, such as reflecting ground planes, polarizers, frequency selective surfaces, RF shutters and reflector antennas; other devices include RF switches, phase shifters, switchable filters, matching networks, continuous transverse stub (CTS) array antennas, and the like.

Some of the advantages of the present invention are that conductive line segments, light manifold and optical switches are provided by an integrated assembly that is easy to embed in structures. A single light source, rather than one for each junction, is used to reconfigure the entire segmented line element. Because the control mechanism of the present line element is optical rather than electronic in nature, it does not emit, nor is it susceptible to, electromagnetic radiation. Sub-microsecond switching speeds can be obtained using only milliwatts of optical power per line element. The present line element may be produced using automated, low-cost production techniques.

While the present invention can be used as the basic element for constructing a multitude of antenna and microwave devices with optically reconfigurable attributes, it was specifically conceived for application to continuous transverse stub (CTS) array antennas. For example, the assignee of the present invention is currently developing a CTS electronically scanned array antenna that uses a voltage-variable dielectric (VVD) to obtain beam steering capable of about 10 or 15 degrees in one plane. Because it is often required to steer the beam over a much wider angle (e.g., ±60°), frequency scanning is used to enhance VVD scan capability. The major drawback to frequency scanning is that it takes up a large amount of RF spectrum, which can be undesirable from an operational standpoint. The present invention may be employed with the CTS antenna so the beam can be step-scanned to new beam-starting positions (e.g., ±15°, ±30° and ±45°), from which the VVD scan can be launched to give full wide-angle coverage.

This discrete optical fiber configuration of the present invention described herein is not suitable for millimeter wave applications. However, an integrated version implemented with silicon-on-insulator (SOI) or indium-phosphide (InP) technologies may be used to operate well into the millimeter wave range.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIGS. 1a–1c illustrate a generic form of an optically reconfigurable conductive line element in accordance with the principles of the present invention, and wherein FIG. 1a shows how sections of a conductive layer are periodically removed from a conductively-jacketed optical fiber;

FIG. 1b shows that the photoinduced Bragg gratings, located at each gap, tap off a fraction of light that is made incident upon and propagates down the optical fiber; and FIG. 1c shows how photoconductive material or devices are connected across each of the gaps in the conductive layer of the optical fiber.

DETAILED DESCRIPTION

Referring to the drawing figures, FIGS. 1a–1c illustrate a generic form of an optically reconfigurable conductive line element 10 in accordance with the principles of the present invention. The optically reconfigurable conductive line element 10 is comprised of an optical fiber 11 having a core 11a and a conductive layer 12 disposed therearound. The conductive layer 12 may be a conductive metal jacket 12 such as aluminum, for example. The conductive layer 12 has sections that are periodically removed therefrom that form gaps 13 in the conductive line element 10 to expose the underlying optical fiber 11. FIG. 1a shows the periodically removed sections of the conductive layer 12 which expose the optical fiber 11.

Light manifolds 14 are formed at each gap 13. In the disclosed embodiment, Bragg gratings 14 are photoinduced in the core 11a of the optical fiber 11 at each gap 13. FIG. 1b shows the photoinduced Bragg gratings at each gap 13 which are used to tap off a portion of the light that is made incident upon and propagates down the optical fiber 11. Photoconductive material 15 or a photoactivated switching device 16 or switch 16 is connected across or around each of the gaps 13 in the conductive layer 12 or metal jacket 12, as is shown in FIG. 1c. An opaque coating 17 may be disposed over the outside of the photoconductive material 15, if required, to ensure that it is activated only by light propagating within the optical fiber 11. The optical fiber 11 constructed as described above provides multiple functions including that of an electrical conductor, a light manifold, and a substrate on which the photoconductive material 15 is deposited or to which the photoactivated switching devices 16 are attached.

In order to produce the optically reconfigurable conductive line element 10, a segmented conductive line element 10 is made by periodically removing sections of the metal jacket 12 or conductive layer 12 surrounding the core 11a of the optical fiber 11. Light is normally confined within the core 11a of the optical fiber 11 due to total internal reflection. However, the optical fiber 11 is made into a series bus, wherein small amounts of light are coupled out at many points, using the photoinduced Bragg gratings 14 in the core 11a of the optical fiber 11. The photoinduced Bragg gratings 14 may be produced by employing methods disclosed in "Formation of Bragg Gratings in Optical Fibers by a Transverse Holographic Method," by Meltz, et al., published in Opt. Lett. 14, 1 Aug. 1989, pp. 823–825.

The photoconductive material 15 may be high-conductivity silicon, for example, which is deposited or otherwise attached across or around the gaps 13 in the conductive layer 12 surrounding the core 11a of the optical fiber 11. The opaque coating 17 disposed over the outside of the photoconductive material 15 ensures that it is activated only by light propagating inside the optical fiber 11. When light is introduced into the optical fiber 11, the photoconductive material 15 becomes illuminated and switches to the conducting state, connecting segments of the conductive line element 10 together.

Typical metal-jacketed optical fibers 11 have 8.3 micron (~⅓ mil) diameter core, a 125 micron (~5 mil) diameter glass cladding and a 200 micron (~8 mil) diameter aluminum jacket 12. The aluminum jacket 12 serves as an electrical conductor, and also provides structural integrity for the delicate glass core and cladding of the optical fiber 11 and protection from the environment. Consequently, removing sections of the metal jacket 12 as illustrated in FIG. 1a is a delicate operation and thus more robust plastic fibers 11 may be employed.

The maximum diameter of the optical fiber 11 that may be used depends on the intended RF operating frequency of the conductive line element 10. As a rule of thumb, if the diameter of the optical fiber 11 is kept less than about $\lambda/30$, where $\lambda$ is the operating frequency, then the conductive line segments will not appreciably perturb the RF fields, until connected together. Optical fibers 11 as large as one millimeter (~39 mils) in diameter may be used at frequencies of 10 GHz and below.

Plastic optical fibers 11 require a much simpler treatment than glass optical fibers 11 to form the tapped light bus that is implemented by the present conductive line element 10. Scuffing the surface of the plastic fiber 11 in the gaps 13 diffuses propagating light outward into the photoconductive material 15. Although plastic optical fibers 11 can have up to two orders of magnitude greater attenuation than high-grade glass optical fibers 11, the additional loss of light energy is insignificant for most antenna applications with dimensions of just a few meters.

Certain applications may require that only selected photoconductive cells 15a be addressed, such as odd-numbered, even-numbered, or individually designated cells 15. This may be accomplished using illumination techniques such as wavelength division multiplexing or polarization discrimination within the optical fiber 11 and crossed fibers (not shown) or holograms (not shown) applied externally to the conductive line element 10.

The simplest kind of optically-controlled switch 16 is provided by photoconductive material 15 across or around the gap 13 and designed to have a high "off-state" impedance in the dark and a much lower "on-state" impedance when illuminated with a low level of optical power. However, the optical power requirements of such switches 16 are sensitively dependent on surface and bulk carrier recombination and on diffusion effects. In the simplest photoconductive switch designs, these two effects work against each other to make optical power requirements of the switch 16 as high as 200 milliwatts for a theoretical on/off ratio of 40 dB at 7 GHz. An alternative photoconductive switch 16 is a photovoltaic field-effect transistor (PV-FET), which is an FET that has its gate voltage controlled by a photovoltaic cell and thus behaves as a photovoltage-controlled resistor. This switch 16 is described in "Optoelectronic Devices for Unbiased Microwave Switching," Symp. Digest, IEEE Microwave Theory and Techniques International Symposium (Albuquerque, N.Mex.), June 1992, pp. 673–676, by Freeman, et. al. Tuned hybrid PV-FETs have demonstrated optical sensitivities of 100 microwatts for on/off ratios in excess of 25 dB at 7 GHz. Compact integrated versions of these switches 16 may be made using photolithographic processes and are thus ideally suited for use with the present conductive line element 10.

A number of antenna and other microwave devices that may be built using the present conductive line element 10. Of particular interest are applications involving continuous transverse stub (CTS) antenna arrays. The present invention may be used to enhance the scan capability of a voltage variable dielectric continuous transverse stub electronically scanned antenna array.

Thus, improved optically reconfigurable employing conductive line elements have been disclosed. It is to be understood that the described embodiment is merely illustrative of some of the many specific embodiments which represent applications of the principles of the present invention. Clearly, numerous and varied other arrangements may be readily devised by those skilled in the art without departing from the scope of the invention.

What is claimed is:

1. An optically reconfigurable conductive line element comprising:

an optical fiber having a core and a conductive layer disposed therearound, and wherein a plurality of sections are removed from conductive layer to form gaps therein to expose the underlying optical fiber;

a light source for injecting light into the optical fiber;

a light manifold formed in the optical fiber at each gap, which taps off a portion of the light that is injected into and propagates down the optical fiber; and photoconductive material disposed in each of the gaps in the conductive layer.

2. The conductive line element of claim 1 wherein the light manifold comprises a Bragg grating photoinduced in the core of the optical fiber at each gap, which grating taps off a portion of the light that is injected into and propagates down the optical fiber.

3. The conductive line element of claim 1 wherein the light manifold comprises a light diffuser formed by scuffing the surface of the optical fiber at each gap, which taps off a portion of the light that is injected into and propagates down the optical fiber.

4. The conductive line element of claim 1 wherein the optical fiber comprises a plastic optical fiber and wherein the light manifold comprises a light diffuser formed by scuffing the surface of the optical fiber at each gap, which taps off a portion of the light that is injected into and propagates down the optical fiber.

5. The conductive line element of claim 1 wherein the photoconductive material comprises a switching device.

6. The conductive line element of claim 5 wherein the switching device comprises a photovoltaic field effect transistor.

7. The conductive line element of claim 1 wherein the conductive layer comprises a metal jacket.

8. The conductive line element of claim 2 wherein the metal jacket comprises aluminum.

9. The conductive line element of claim 1 further comprising:

an opaque coating disposed over the outside of the photoconductive material to ensure that it is activated only by light propagating within the optical fiber.

10. The conductive line element of claim 1 wherein the optical fiber comprises glass.

11. The conductive line element of claim 1 wherein the optical fiber comprises plastic.

12. An optically reconfigurable conductive line element comprising:

an optical fiber having a core and a conductive layer disposed therearound, and wherein a plurality of sections are removed from conductive layer to form gaps therein to expose the underlying optical fiber;

a light source for injecting light into the optical fiber;

a Bragg grating 4 photoinduced in the core of the optical fiber at each gap, which grating taps off a portion of the light that is injected into and propagates down the optical fiber;

photoconductive means disposed in each of the gaps in the conductive layer; and an opaque coating disposed over the outside of the photoconductive means to ensure that it is activated only by light propagating within the optical fiber.

13. The conductive line element of claim 12 wherein the photoconductive means comprises photoconductive material.

14. The conductive line element of claim 12 wherein the photoconductive means comprises a switching device.

15. The conductive line element of claim 14 wherein the switching device comprises a photovoltaic field effect transistor.

16. The conductive line element of claim 12 wherein the conductive layer comprises a metal jacket.

17. The conductive line element of claim 16 wherein the metal jacket comprises aluminum.

18. The conductive line element of claim 12 wherein the optical fiber comprises glass.

19. The conductive line element of claim 12 wherein the optical fiber comprises plastic.

* * * * *